United States Patent
Lorkin

(10) Patent No.: US 6,848,352 B2
(45) Date of Patent: Feb. 1, 2005

(54) PNEUMATIC BRAKE BOOSTER WITH REDUCED NOISE LEVELS

(75) Inventor: Timothy Lorkin, Paris (FR)

(73) Assignee: Robert Bosch GmbH, Stuttgart (DE)

( * ) Notice: Subject to any disclaimer, the term of this patent is extended or adjusted under 35 U.S.C. 154(b) by 64 days.

(21) Appl. No.: 10/430,723

(22) Filed: May 6, 2003

(65) Prior Publication Data

US 2003/0209136 A1 Nov. 13, 2003

(30) Foreign Application Priority Data

May 7, 2002 (FR) .......................................... 02 05774

(51) Int. Cl.[7] ................................................ F15B 9/10
(52) U.S. Cl. ..................................................... 91/376 R
(58) Field of Search ........................... 91/376 R, 369.1, 91/369.2, 367

(56) References Cited

U.S. PATENT DOCUMENTS

| | | | |
|---|---|---|---|
| 3,160,549 A | * 12/1964 | Caldwell et al. | 428/317.3 |
| 5,024,304 A | * 6/1991 | Booten et al. | 188/356 |
| 5,331,813 A | * 7/1994 | Heibel et al. | 60/547.1 |
| 5,784,946 A | * 7/1998 | Malosh et al. | 91/376 R |

* cited by examiner

Primary Examiner—Edward K. Look
Assistant Examiner—Michael Leslie
(74) Attorney, Agent, or Firm—Leo H. McCormick, Jr.; Warren Comstock

(57) ABSTRACT

A pneumatic brake booster comprising an envelope formed of two shells (3, 5) defining an interior volume divided into two chambers by a skirt mounted so that it can slide with sealing. The skirt (7) is actuated by a pressure difference brought about by the operation of a three-way valve (17) arranged in a pneumatic piston arranged more or less in the central part of the skirt. The booster also comprising means (53) for reducing the noise, characterized in that the means (53) are bearing means comprising a layer of elastomer arranged between one of the shells (3, 5) and a rigid element.

4 Claims, 3 Drawing Sheets

PNEUMATIC BRAKE BOOSTER WITH REDUCED NOISE LEVELS

The present invention relates mainly to a pneumatic brake booster comprising means for reducing the noise.

BACKGROUND OF THE INVENTION

Braking circuits of known type comprise a master cylinder boosted by a pneumatic brake booster, the braking circuit being actuated by a control rod connected to a brake pedal. Brake circuits also increasingly often comprise brake regulating devices so as to prevent the wheels from locking under emergency braking and thus improve the driver's control of the vehicle, these devices are known as ABS devices. ABS devices comprise an electronic computer gathering information from sensors arranged at the wheels of the vehicle so as to detect the locking of the wheels; ABS devices also comprise electrically operated valves, at least one pressure accumulator, a hydraulic pump, for example an electric pump for supplying pressurized brake fluid.

When the computer of the ABS device detects that wheels are becoming locked, the computer initially releases the braking at the wheels close to locking and then increases the pressure of the brake fluid at these wheels in order to brake them once again, and to do, that, the hydraulic pump is brought into operation. The operation of the ABS device is likely to cause vibration, this vibration being transmitted to the entirety of the hydraulic circuit and causing noise to occur. This noise is annoying to the driver, on the one hand for his driving comfort and, on the other hand, because he may worry that his braking circuit is not operating correctly.

The Applicant Company has discovered that this vibration is transmitted via the master cylinder to the booster, then via the booster to the bulkhead separating the engine compartment from the cabin of the vehicle and also to the pedalbox. This vibration is therefore a source of noise, the booster being particularly sensitive to this vibration because of the small thickness of the sheet metal of which the outer wall of the booster is made. In addition, vibration at the pedalbox gives the driver of the vehicle an unpleasant feeling.

Devices are known that reduce the noise caused by vibration in the wheel cylinders when the ABS device is in operation, these comprising a sensor associated with each wheel cylinder and transmitting to the electronic control unit a signal corresponding to the noise caused by the vibration. The control unit then sends a signal to the electrically operated valves so as to regulate the pressure of the brake fluid supplied to each wheel cylinder and cause vibration at a predetermined frequency so as to cancel the vibrations due to the operation of the ABS device. However, this device is very expensive, difficult to implement, and requires very minute adjustments.

SUMMARY OF THE INVENTION

It is therefore an object of the present invention to offer a pneumatic brake booster with low sound volume.

It is also an object of the present invention to offer a pneumatic brake booster that is simple to manufacture and simple to fit on the vehicle.

It is also an object of the present invention to offer such a pneumatic brake booster of a bulk comparable to boosters of known type.

It is also an object of the present invention to offer a braking system that has a good pedal feel.

These objects are achieved by a pneumatic brake booster according to the present invention, formed of a first metal shell and of a second metal shell and comprising means pressed against at least one of the shells of the booster so as to stiffen said shell and thus reduce the vibration of the booster and the transmission of this vibration to the bulkhead separating the engine compartment from the cabin and to the pedalbox.

The present invention also advantageously makes it possible to improve the quality of the high-frequency noise to which drivers are particularly sensitive.

The main subject of the present invention is a pneumatic brake booster comprising an envelope formed of two shells defining an interior volume divided into two chambers by a skirt mounted so that it can slide with sealing, said skirt is actuated by a pressure difference brought about by the operation of a three-way valve arranged in a pneumatic piston arranged more or less in the central part of the skirt, said booster also comprising means for reducing the noise, characterized in that said means are bearing means comprising a layer of elastomer arranged between one of the shells and a rigid element.

Another subject of the present invention is a pneumatic brake booster, characterized in that the means have the form of a cover comprising a central orifice and extending radially outward in the form of a rim of roughly frustoconical shape, one of the radial ends of which bears against one of the shells.

Another subject of the present invention is a pneumatic brake booster, characterized in that a rubber element is inserted between the radially outer end of the rim and the envelope of the booster.

Another subject of the present invention is a pneumatic brake booster, characterized in that the rubber element is an annular cap bordering the radially outer end of the cover.

Another subject of the present invention is a pneumatic brake booster, characterized in that the means are fixed to said booster by a screw-nut assembly.

Another subject of the present invention is a pneumatic brake booster, characterized in that the means have the shape of a disk.

Another subject of the present invention is a pneumatic brake booster, characterized in that the means are fixed to said booster by bonding.

Another subject of the present invention is a pneumatic brake booster, characterized in that the layer of elastomer is included between the rigid first element and a rigid second element.

Another subject of the present invention is a pneumatic brake booster, characterized in that the rigid elements are made of steel sheet.

Another subject of the present invention is a pneumatic brake booster, characterized in that the rigid elements are made of aluminum sheet.

Another subject of the present invention is a pneumatic brake booster, characterized in that the means are made of sandwich sheet.

The present invention will be better understood with the aid of the description which will follow and of the attached drawings for which the front and the rear correspond respectively to the left and the right in the drawings.

DETAILED DESCRIPTION OF THE INVENTION

The same references are used in all the figures to denote elements which have more or less the same function.

All of the elements described have a shape which has a symmetry of revolution about an axis X, the longitudinal axis of the booster.

Figure 1:
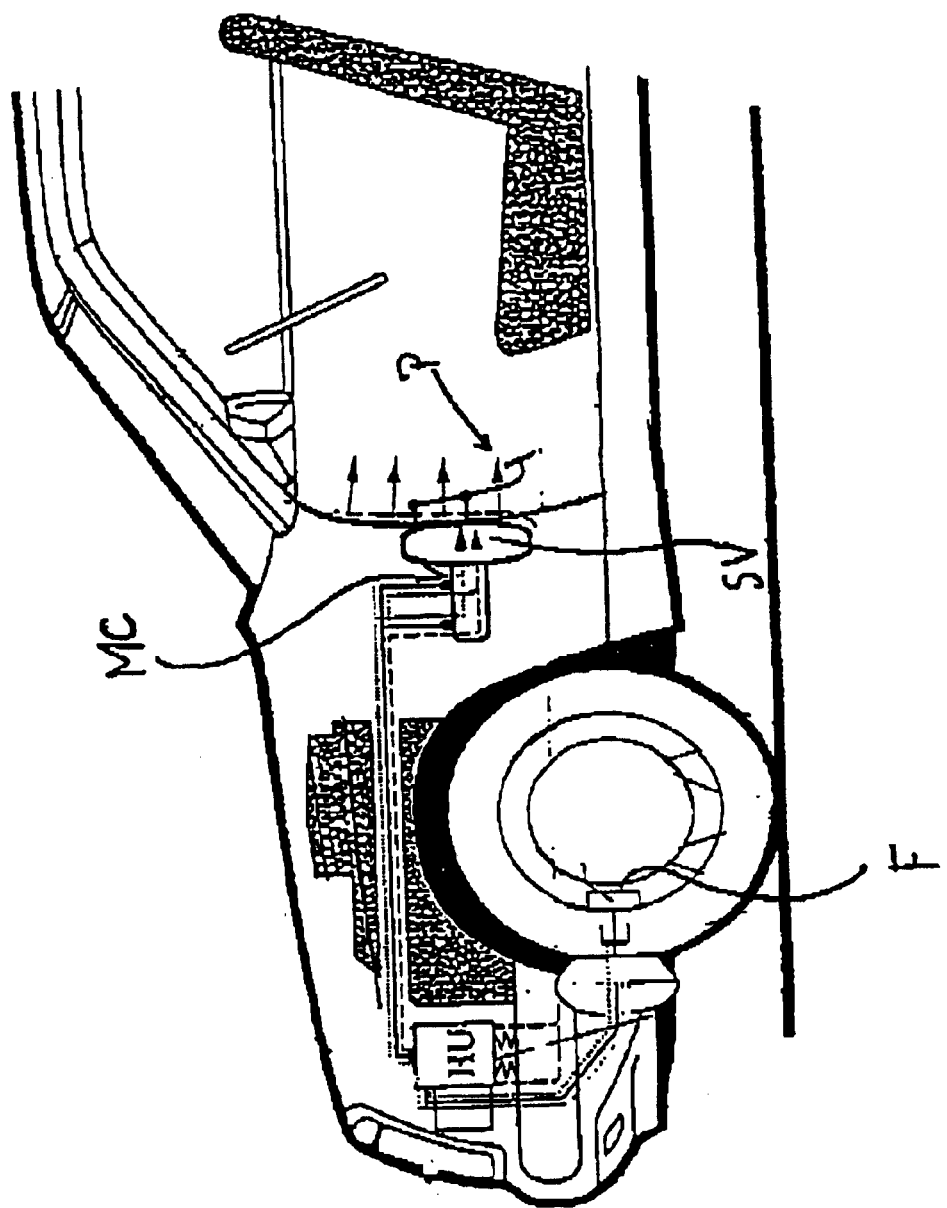
FIG. 1 is a diagram of a braking circuit comprising an antilock braking system.

FIG. 1 is a schematic overview of a motor vehicle comprising a brake circuit equipped with a pedalbox P comprising at least one brake pedal actuating a control rod controlling a pneumatic brake booster of known type SV and a master cylinder MC connected to the brakes F arranged at the wheels. The braking circuit also comprises an ABS device HU arranged between the master cylinder and the wheels. The arrows depict the direction in which noise and vibration caused by the operation of the ABS device is transmitted.

Figure 2:
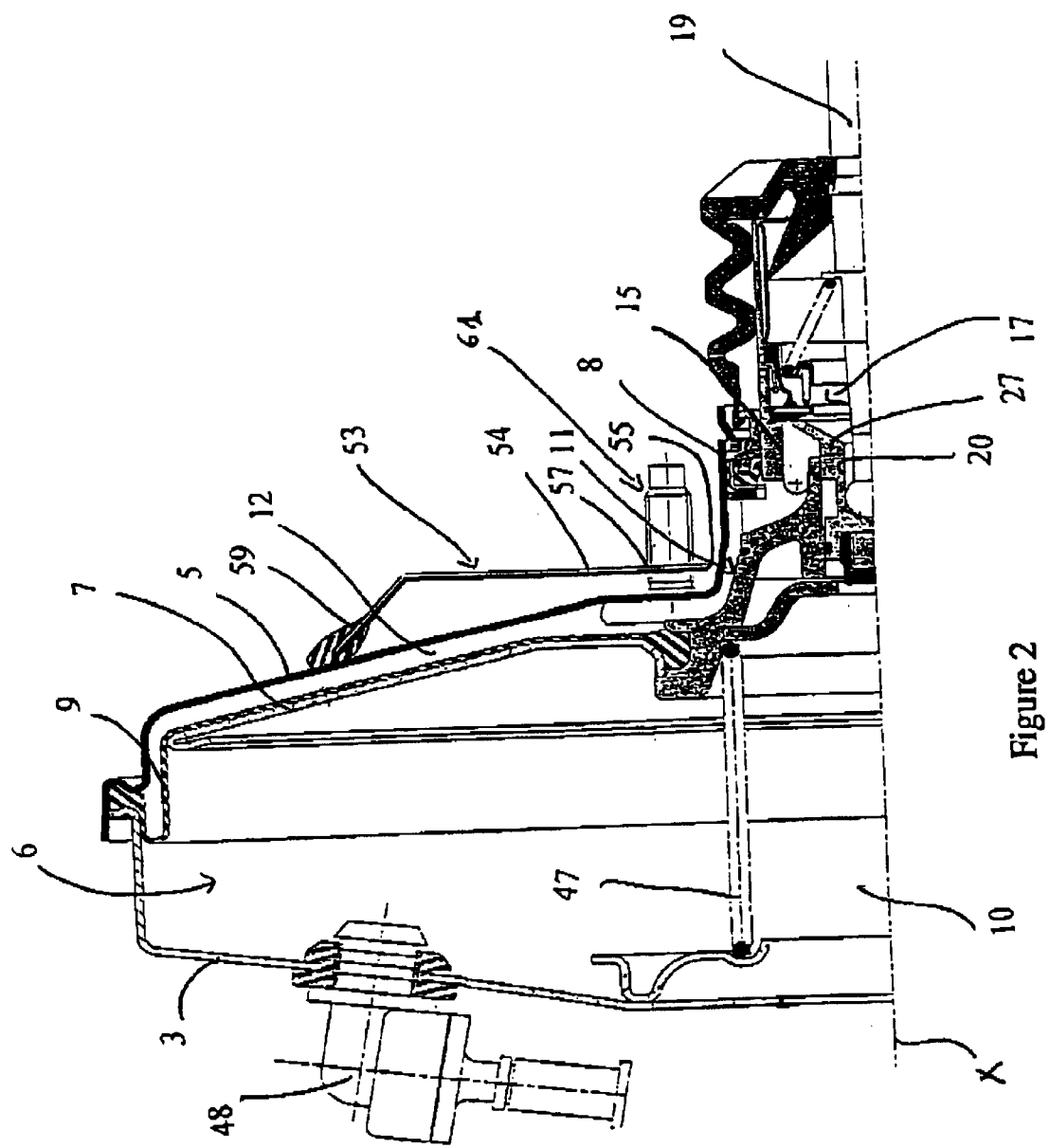
FIG. 2 is a half view in longitudinal section of a first embodiment of a pneumatic brake booster according to the present invention.

FIG. 2 shows a pneumatic brake booster according to the present invention, of longitudinal axis X, comprising an envelope 1 formed of a first shell and a second shell 3, 5, crimped together around their exterior contour and defining an interior volume 6, the rear shell 5 extending toward the rear in the form of a sleeve 8 and the front shell 3 having an orifice to house a master cylinder (not depicted). The booster also comprises a moving annular wall 7 mounted to slide with sealing in the envelope 1 and dividing the volume 6 into a low-pressure chamber 10 situated in front of the wall 7 and a variable-pressure chamber 12 situated at the rear of the booster; sealing is afforded for example by means of a rolling membrane 9 made of rubber. The booster also comprises a pneumatic piston 11 arranged in the central part of the wall 7 and in its rear part of a more or less cylindrical sleeve 15. The pneumatic piston 11 is mounted to slide with sealing in the sleeve 8 via sealed means 16.

Arranged in the sleeve 15 is a three-way valve 17 controlled by a control rod 19 connected at a first longitudinal end toward the rear to a brake pedal (not depicted) and housed at a second end, the opposite end to the first end, in a more or less frustoconical cavity 20 made in the rear part of a plunger 21.

We shall not describe the structure of the three-way valve, which is known.

A return spring 47 is also mounted between the front face of the pneumatic piston 11 and the shell 3 in the vacuum chamber.

A push rod (not depicted) is arranged in front of the plunger actuating at least one piston of a master cylinder (not depicted), a reaction disk (not depicted) made of more or less incompressible material is arranged between the plunger 21 and the push rod, so as to pass the reaction of the braking circuit on to the driver.

The front chamber is permanently connected to a vacuum source by a sealed connection means, for example a pipe 48 fixed in the shell 1 and connected for example to a vacuum pump.

At rest, the three-way valve 17 places the work chamber 12 and the vacuum chamber 10 in communication, and during a braking phase, the three-way valve interrupts the communication between the low-pressure chamber 10 and the variable-pressure chamber 12 and places the work chamber 12 in communication with the environment at high pressure, for example air at atmospheric pressure, the wall is then set in motion in the direction of the arrow 51 under the effect of the difference in pressure between the two chambers 10, 12. The push rod 49 therefore also moves in the direction of the arrow 51 and actuates at least one piston of a master cylinder (neither depicted).

The booster also comprises a means 53 for deadening the noise, this means being arranged on the outside of the envelope 1 and fixed to the exterior surface of at least one shell 3, 5. The means 53 has more or less the form of a cover 54 equipped with a central orifice 55 bordered by passages 57 for the fixing of the means 53 to the booster; of these passages 57, there are advantageously four, angularly distributed. The cover 54 is also equipped with a radially outer end formed of a rim 59 of more or less frustoconical shape, advantageously directed outward.

The means 53 is arranged around the sleeve 8 of the booster, the cone angle of the rim 59 oriented toward the actuating rod and the radially outer end of the rim 59 pressing against the shell 5 of the booster. The cover 51 is fixed rigidly to the booster by fixing means 61, for example a screw-nut assembly. The fixing means 61 may advantageously be the same as the means used to fix the booster to the vehicle bulkhead.

The means 53 is made of a material comprising a layer of elastomer, for example of rubber, bonded against at least one rigid element, for example steel sheet or aluminum sheet, and advantageously between two rigid elements, of the "sandwich sheet" type, with a good deadening power.

The means 53 is advantageously equipped on its entire external circumference with an annular cap, for example made of rubber, in contact with the shell of the booster.

Figure 3:
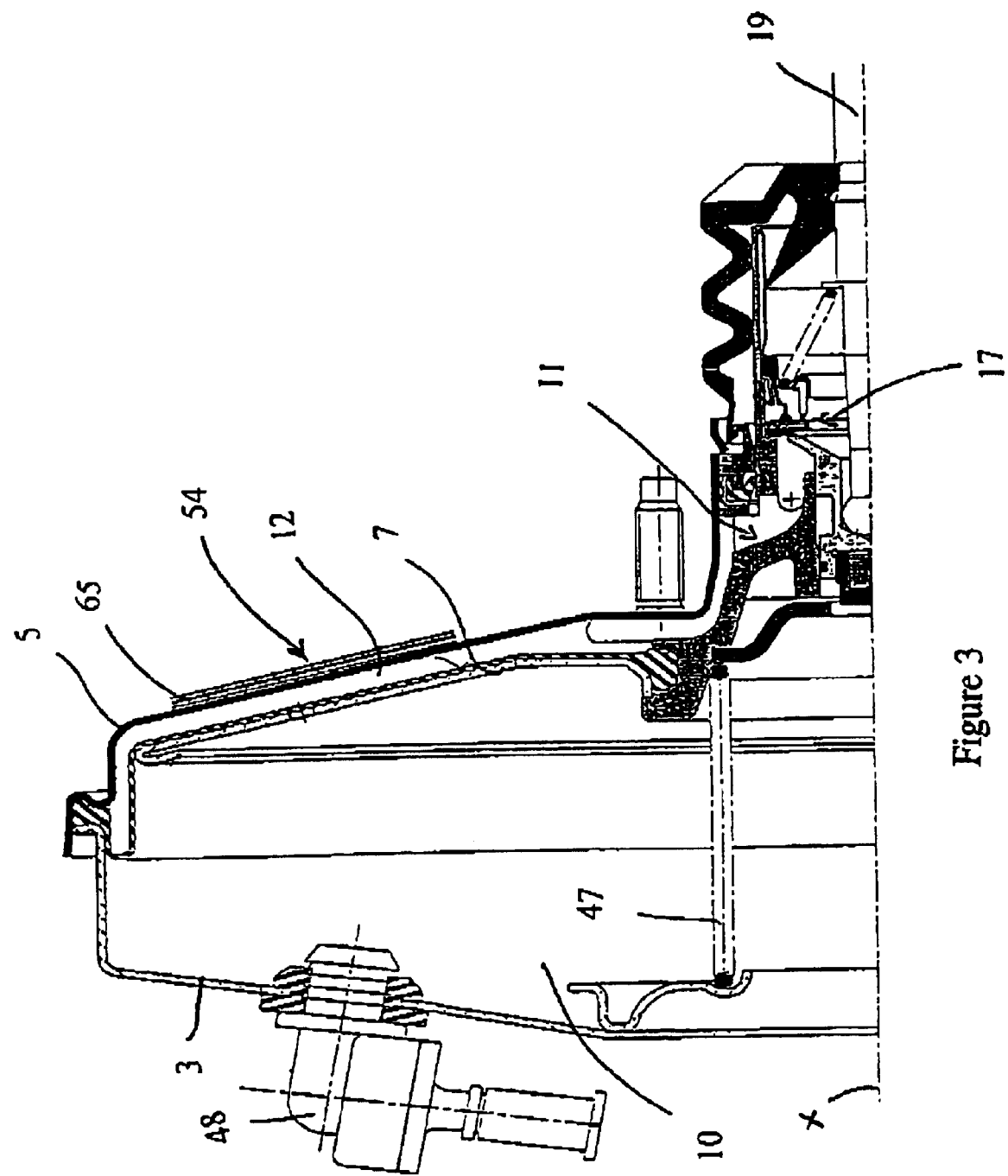
FIG. 3 is half view in longitudinal section of a second embodiment of a pneumatic brake booster according to the present invention.

FIG. 3 shows a second embodiment of a means for deadening the noise according to the present invention.

The means 53 is formed of a disk 65 on one of the shells of the booster, advantageously by bonding. In FIG. 3, the means 53 is mounted on the rear face of the booster around the sleeve 8.

The means 53 is made of a material comprising a layer of elastomer, for example, rubber, bonded between at least one rigid element, for example steel sheet or aluminum sheet, and advantageously between two rigid elements of the "sandwich sheet" type with a good deadening power.

The booster according to the present invention makes it possible to reduce by 1 to 2 decibels the noise caused by the braking system when the antilock braking system operates.

Of course, arranging the noise-deadening means on the interior face or exterior face of the shells does not constitute a departure from the scope of the present invention.

Of course, using the means 53 on both shells of the booster does not constitute a departure from the scope of the present invention.

The present invention applies mainly to the motor industry.

The present invention applies in particular to the industry concerned with braking systems for motor vehicles, especially for private cars.

What is claimed is:

1. A pneumatic brake booster comprising an envelope formed of two shells (3, 5) to define an interior volume that is divided into two chambers by a skirt mounted to sealingly slide therein, said skirt (7) being moved by a pressure difference brought about through the operation of a three-way valve (17) that is located in a pneumatic piston that is located along a central axis of said skirt, said booster including means (53) for reducing noise created during the operation of said three-way valve (17) characterized by a layer of elastomer material that is located between one of said two shells (3, 5) and a rigid element, said means (53) having the form of a cover with a central orifice (56) and a radially outward extending rim (59) with a frustoconical shape on a radial end and a rubber element defined by an annular cap that is attached to said radial end, said annular cap being a rubber element that is inserted between said radial end of the rim (59) and the envelope (1) of the booster to engage one of said shells (3, 5) and thereby dampen noise carried through said engaged shell (3,5).

2. The pneumatic brake booster according to claim 1, characterized in that the means (63) are fixed to said booster by a screw-nut assembly.

3. The pneumatic brake booster according to claim 1, characterized in that the rigid elements are made of steel sheet.

4. The pneumatic brake booster according to claim 1, characterized in that the rigid elements are made of aluminum sheet.

\* \* \* \* \*